(12) United States Patent
Mashima et al.

(10) Patent No.: US 7,003,595 B2
(45) Date of Patent: Feb. 21, 2006

(54) INFORMATION PROCESSING SYSTEM AND INFORMATION PROCESSING METHOD

(75) Inventors: Takao Mashima, Fujisawa (JP); Katsuhiro Uchiumi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 67 days.

(21) Appl. No.: 10/826,470

(22) Filed: Apr. 16, 2004

(65) Prior Publication Data

US 2005/0188126 A1 Aug. 25, 2005

(30) Foreign Application Priority Data

Feb. 25, 2004 (JP) .............................. 2004-050041

(51) Int. Cl.
*G03F 3/00* (2006.01)
(52) U.S. Cl. .......................... 710/36; 710/7; 711/152; 711/149
(58) Field of Classification Search ...................... None
See application file for complete search history.

(56) References Cited

U.S. PATENT DOCUMENTS

| | | | | |
|---|---|---|---|---|
| 5,913,227 | A | * | 6/1999 | Raz et al. .................... 711/152 |
| 6,260,120 | B1 | * | 7/2001 | Blumenau et al. ........... 711/152 |
| 2003/0236884 | A1 | | 12/2003 | Yamamoto et al. |
| 2004/0049572 | A1 | | 3/2004 | Yamamoto et al. |
| 2004/0073760 | A1 | * | 4/2004 | Arimilli et al. .............. 711/163 |
| 2004/0088574 | A1 | * | 5/2004 | Walter et al. ................ 713/201 |
| 2004/0210656 | A1 | | 10/2004 | Beck et al. |
| 2005/0033804 | A1 | | 2/2005 | Iwami et al. |

FOREIGN PATENT DOCUMENTS

| | | |
|---|---|---|
| JP | 08-221309 | 8/1996 |
| JP | 09-062499 | 3/1997 |
| JP | 2003-131897 | 5/2003 |

\* cited by examiner

*Primary Examiner*—Kim Huynh
*Assistant Examiner*—Niketa Patel
(74) *Attorney, Agent, or Firm*—Townsend and Townsend and Crew LLP

(57) ABSTRACT

The invention relates to exchanging micro programs in a storage device, automatically, without halting operation. In one embodiment, the path adapters of a host computer are connected to the input/output ports of respective clusters of a storage device, by respective connection paths. Path switching software is provided in the host computer, as well as database indicating connection destinations of the connection path. In the storage device, the input/output ports are connected to a group of a plurality of hard disk drive devices. An internal management device, and a database indicating the connection destination of each input/output port, are provided in the storage device. The management server device is connected to a host computer and a storage device, via a LAN, and a program exchanging program and micro programs to be used in exchange are provided in this management server device. Instructions for invoking the program are issued from the computer.

5 Claims, 14 Drawing Sheets

FIG.3

| CL# | CHA# | Port# | WWN# | Drv# | |
|---|---|---|---|---|---|
| CL1 | CHA1 | Port1A | WWN11 | Drv001 | |
| | | | | Drv002 | |
| | | | | Drv003 | |
| | | | | Drv004 | |
| | | | WWN12 | Drv005 | |
| | | | | Drv006 | |
| | | | | Drv007 | |
| | | | : | : | |
| | | | WWN1n | Drv050 | |
| | | | | Drv051 | |
| | | | | Drvnnn | |
| | | Port1B | WWN21 | Drv211 | |
| | | | | Drv212 | |
| | | | | : | |
| | | | | Drv21n | |
| | | | WWN22 | Drv221 | |
| | | | | Drv222 | |
| | | | | : | |
| | | | | Drv22n | |
| | | | : | : | |
| | | | WWN2n | Drv2n1 | |
| | | | | Drv2n2 | |
| | | | | : | |
| | | | | Drv2nn | |
| | | : | | | |
| | | Portnn | | | |
| | CHA2 | | | | |
| | : | | | | |
| | CHAn | | | | |
| CL2 | CHA1 | Port2A | WWN22 | Drv001 | |
| | | | | Drv002 | |
| | | | | Drv003 | |
| | | | | Drv004 | |
| | CHA2 | | | | |
| | : | | | | |
| | CHAn | | | | |

FIG.4

| HOST# | EXCHANGE PATH-SOFTWARE | SETTING | PATH STATUS | WWN# | CONNECTION DESTINATION RAID# |
|---|---|---|---|---|---|
| HOST1 | YES | Road Balance | OK | WWN11 | RAID1 |
| | | | OK | WWN12 | RAID1 |
| | | | OK | WWN71 | RAID1 |
| | | | OK | WWN72 | RAID1 |
| | | | OK | WWN84 | RAID2 |
| | | | OK | WWN85 | RAID2 |
| HOST2 | YES | Failover | OK | WWN23 | RAID1 |
| | | | NG | WWN15 | RAID3 |
| | | | OK | WWNnn | RAIDn |
| HOST3 | NO | | - | WWN98 | RAID10 |
| | | | - | WWN76 | RAID12 |
| ⋮ | | | | | |
| HOSTn | | | | | |

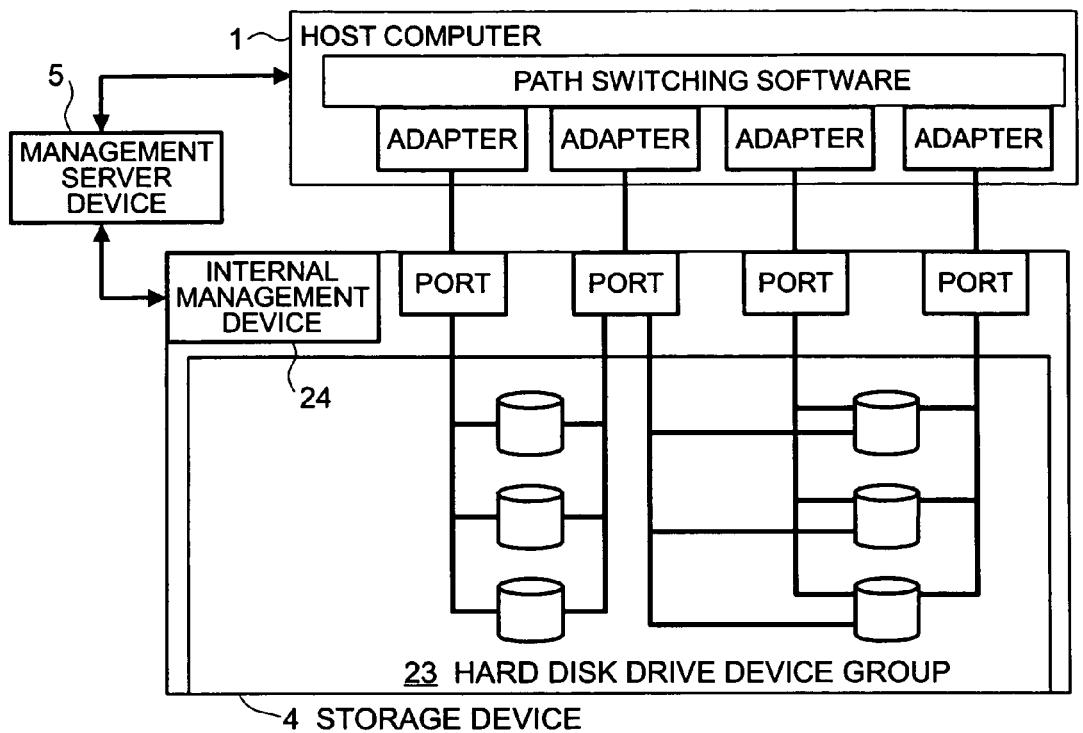
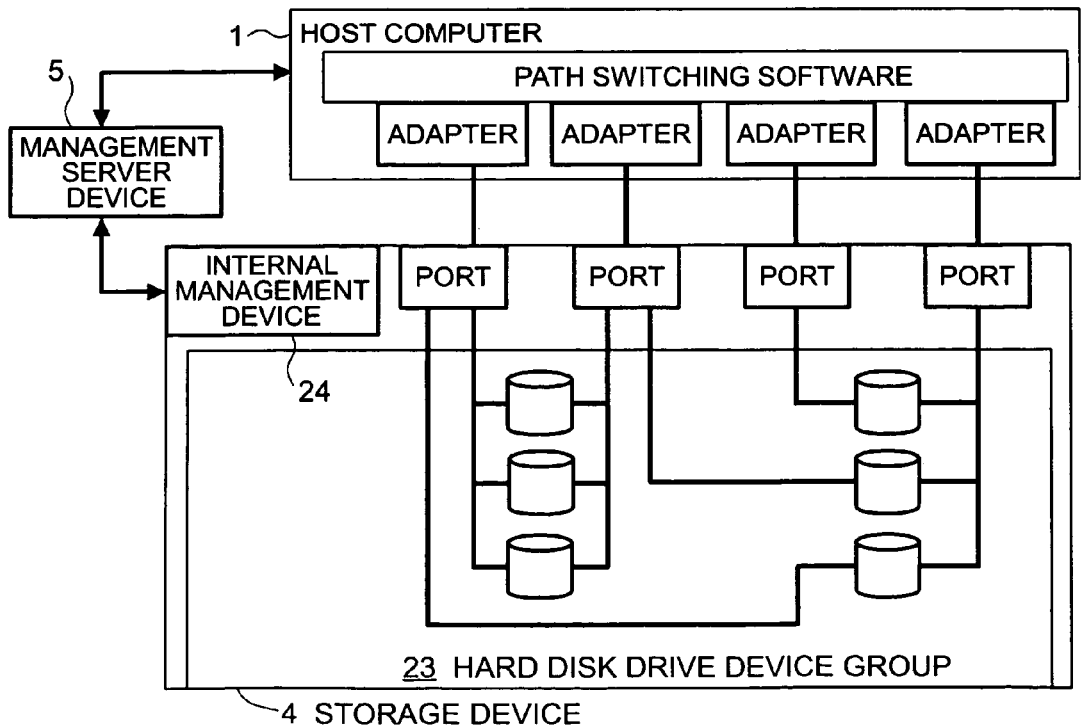

INFORMATION PROCESSING SYSTEM AND INFORMATION PROCESSING METHOD

CROSS-REFERENCE TO RELATED APPLICATIONS

This application relates to and claims priority from Japanese Patent Application No. 2004-050041, filed on Feb. 25, 2004, the entire disclosure of which is incorporated herein by reference.

BACKGROUND OF THE INVENTION

1. Field of the Invention

The present invention relates to an information processing system and an information processing method suitable for use with a RAID (Redundant Arrays of Independent Disks) device, for example. More specifically, the present invention allows exchange (updating) of micro programs provided in a processor of an input/output port of a storage device forming an information processing system, to be carried out with good efficiency, without halting application tasks on the host computer.

2. Description of the Related Art

In a conventional storage device, for example, a RAID device, in order to exchange micro programs without halting operation, it is proposed that a spare port designated exclusively for use during exchange is provided (see, for example, Patent Document 1: Japanese Patent Laid-open No. 2003-131897).

Moreover, means have also been proposed whereby data transfer is performed smoothly by removing concentration on restricted paths and employing two or more connecting path systems between the host computer and the storage device, data being distributed by switching between these paths (see, for example, Patent Document 2: Japanese Patent Laid-open No. H9-62499).

Means have also been proposed whereby, in a device having a plurality of processors, micro programs are exchanged in a state one of the processors is blocked off, and the other processors are operating (see, for example, Patent Document 3: Japanese Patent Laid-open No. H8-221309).

However, none of the patent documents mentioned above describe a method for performing exchange of programs automatically, in a highly efficient manner, as in the present invention.

SUMMARY OF THE INVENTION

In a storage device used in a conventional information management system, such as a RAID device, for example, a composition such as that shown in FIG. 15 is employed. More specifically, FIG. 15 shows the overall composition of a system in a case where a RAID device, for example, is used in a so-called SAN (Storage Area Network) environment.

As shown in FIG. 15, in this system, a RAID device (storage device) 104 is connected, via a connecting section 103 provided with switching means for constituting a SAN environment, to two host computers 101, 102, for example. A plurality of similar connecting sections 103 are provided, and a network is constituted by connecting these together mutually. By this means, it becomes possible to connect to the RAID device 104 from a host computer other than the aforementioned host computers 101, 102.

A plurality of (in the diagram, two) input/output ports 111, 112 are provided in the RAID device 104, each being connected respectively to the connection section 103. Each of the input/output ports 111, 112 is assigned with specific addresses (for example, a WWN (Word Wide Name)), in such a manner that it can be accessed from a host computer 101, 102, or the like, on the basis of these addresses.

Moreover, in the RAID device 104, the input/output ports 111, 112 are connected to a group of a plurality of hard disk drive devices 113. When access from the host computer 101, 102, or the like, is required, a portion of the group of hard disk drive devices 113 is selected according to attribute information previously established at the respective input/output ports 111, 112, and data is input to and output from that portion of disk drives.

In a RAID device 104 of this kind, for example, processors are provided in the input/output ports 111, 112, and data input and output, and the like, is controlled in accordance with micro programs provided in these processors. These micro programs are required to correspond constantly to new data, and the like, and therefore it is necessary to exchange (update) the micro programs.

More specifically, performing exchange of the micro programs is an indispensable element of a RAID device. Therefore, conventionally, when exchanging micro programs, a method is used whereby the application tasks of the host computer are halted in a planned fashion, and the exchange procedure is concentrated into the time period during which these tasks are halted. However, in recent years, uninterrupted operation of storage devices has been demanded, and it has been sought to perform exchange of micro programs whilst in an operational state.

In response to this, in the invention disclosed in Document 1, a new spare port of the same specifications as the input/output ports 111, 112 is provided. When exchanging micro programs, all of the functions of the input/output port in which the micro program is being exchanged are transferred to the spare port, and the application in the host computer continues to be executing via this spare port, in addition to which, the micro program in the original input/output port is exchanged during this period.

However, providing a spare port in this manner means providing surplus constituent elements, and the connections to the host computer, as well as the connections within the RAID, become more complicated. Furthermore, even if a spare port of this kind is used, the task of switching ports, and the like, is carried out manually, and therefore, significant labor, cost and the like, is required in order for a service engineer or a storage administrator to carry out tasks in the location in which the RAID device is situated.

Moreover, the Patent Documents 2 and 3 propose means for performing smooth data transfer by providing a switching path, or means for exchanging micro programs in a state where one of a plurality of processors is blocked off, and the other processors are operating, but even in the case of Patent Document 3, the host computer application connected to the processor that is block off will be halted, and furthermore, the tasks must be carried out manually.

Furthermore, in a RAID device in particular, the correspondence relationships between the input/output ports and the group of hard disk drive devices inside the RAID are constructed manually, and hence there is a problem in that only a person having excellent knowledge of the actual device will be able to understand these correspondence relationships, and therefore, it is difficult to automate the task of exchanging the micro programs, which is carried out by occasionally halting the functions of the input/output ports. Therefore, conventionally, it has been necessary to depend on manual work in order to exchange micro programs in a RAID device.

The present invention was devised with the foregoing in view, the problems to be solved by the present invention being, firstly, the fact that in a conventional device, it is necessary to provide surplus constituent elements, such as spare ports, or the like, in order to exchange micro programs without halting the operation of the storage device, and secondly, the fact that exchanging micro programs requires manual work and cannot be carried out automatically in a conventional device.

Therefore, one embodiment of the present invention is directed to an information processing system, comprising: a host computer having a plurality of adapters; a storage device; and a management server; wherein the host computer establishes communications paths between a plurality of adapters in the host computer and a plurality of host side ports in the storage device, by means of a path switch program; the storage device accumulates information relating to the communications paths, in a shared memory, and an internal management device of the storage device judges whether or not the communications paths can be secured in the event of at least one of a plurality of processors being blocked off; and if it judges that the communications paths can be secured, then the internal management device sends a notification indicating that it is possible to block off the processors for which said judgment was made, to the management server.

By means of this composition, it is possible to exchange micro programs by blocking off processors at a plurality of host side ports of the storage device, in a successive fashion, and hence the micro programs of the storage device can be exchanged without halting operation.

By this means, according to the present invention, it is possible readily to overcome the problems associated with a conventional device, namely, the fact that it has been necessary to provide surplus composition, such as spare ports, or the like, in order to exchange micro programs without halting the operation of the storage device, and the fact that exchanging programs requires manual work and this work cannot be automated in a conventional device.

BRIEF DESCRIPTION OF THE DRAWINGS

FIG. 3 is a compositional diagram of a database for the purpose of describing same:

FIG. 4 is a compositional diagram of a database for the purpose of describing same:

FIG. 9 is a block diagram showing a further composition of an embodiment of the present invention;

FIG. 10 is a block diagram showing yet a further composition of an embodiment of the present invention;

DESCRIPTION OF THE PREFERRED EMBODIMENTS

Figure 1:
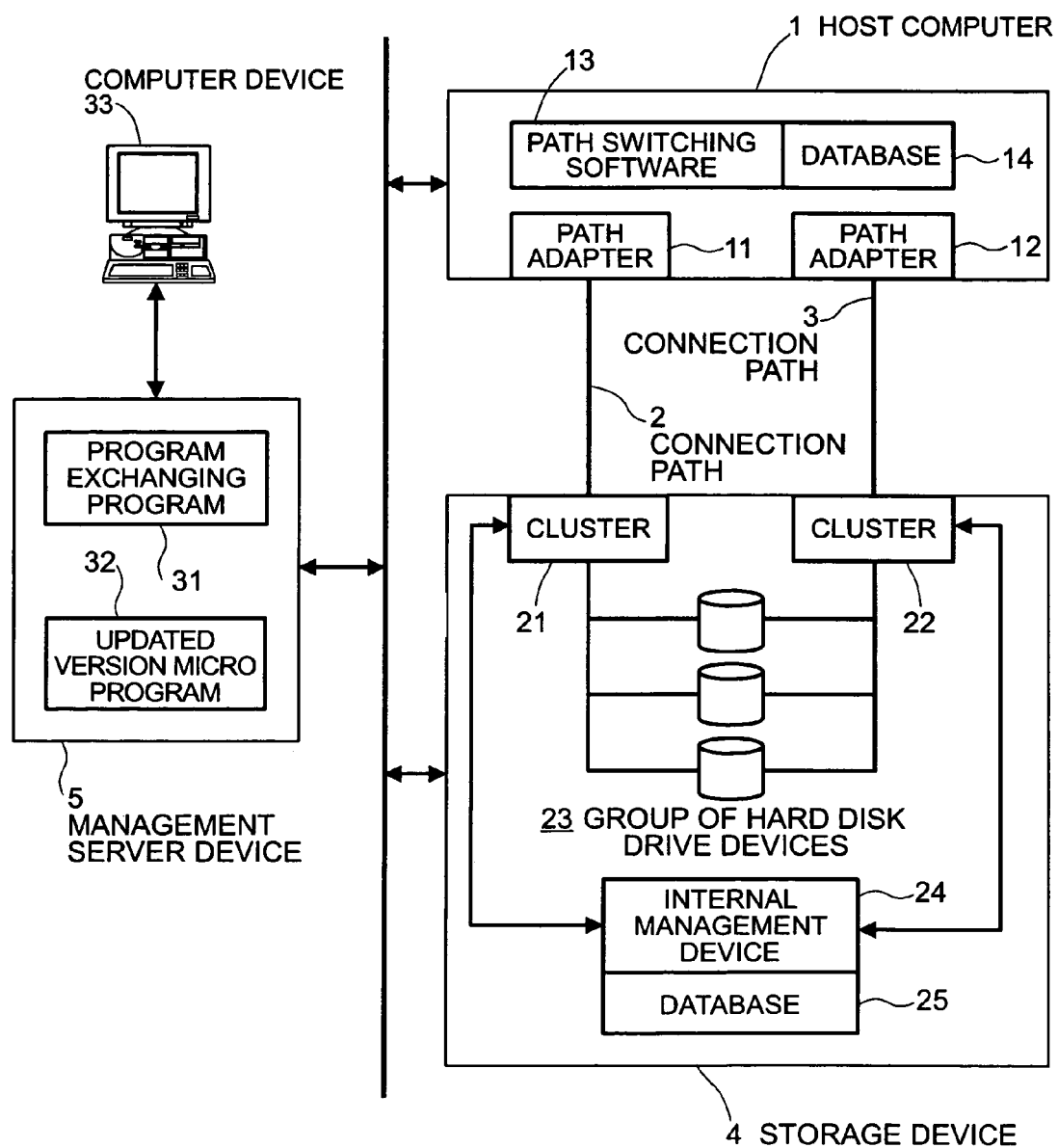
FIG. 1 is a block diagram showing the composition of one embodiment of an information management system to which the present invention is applied.

Below, a preferred embodiment for implementing the present invention is described with reference to the drawings, and FIG. 1 is a block diagram showing the composition of one embodiment of an information management system according to the present invention, and the program exchanging program, program exchange method, storage device, and management server device, used in this system. FIG. 1 shows a mode relating to a DAS (Direct Attach Storage) environment in which a storage device is connected directly to a single host computer, for the purpose of providing a basic description.

In FIG. 1, a plurality of (in the diagram, two) path adapters 11, 12 are provided in the host computer 1, and connection paths 2, 3, are connected respectively to these path adapters 11, 12. Moreover, path switching software 13 such as that disclosed in Patent Document 2 above, for example, is provided in the host computer 1, and processing is carried out for automatically selecting a connection path 2, 3, by taking account of the balance in access load between the connection paths 2, 3, and situation where faults occur in a connection path, or the like. Moreover, in order to carry out these processes, a database 14 for indicating the connection destination of the connection paths 2, 3 is provided.

On the other hand, the RAID device forming a storage device 4 is divided up into a plurality of clusters 21, 22 (numbering two in the diagram), with separate power supply systems, for example. In this case, a plurality of input/output ports are provided for each of the clusters 21, 22. These clusters 21, 22 do not exist in actual hardware terms, but for the convenience of the subsequent explanation, the input/output ports are described as being contained in these respective clusters 21, 22. Therefore, the present invention would be the same, even if these clusters are read to be input/output ports.

The input/output ports of the respective clusters 21, 22 described above are connected respectively to the connection paths 2, 3. Specific addresses (for example, World Wide Names (WWN)) are assigned to each of the input/output ports contained in the path adapters 11, 12 and the respective clusters 21, 22, and access is controlled by means of path switching software 13 in the host computer 1, on the basis of these addresses.

Moreover, the input/output ports of the clusters 21, 22 are connected to a group of a plurality of hard disk drive devices 23. Attribute information for selecting a portion of the devices in the group of hard disk drive devices 23 is previously set at each input/output port. Furthermore, an internal management device 24 for making settings of this kind, and the like, is also provided, and a database 25 indicating connection destinations for the respective input/output ports is provided in this internal management device 24.

Therefore, in a system of this kind, when the storage device 4 is accessed during an application task in the host computer 1, firstly, a connection path 2, 3 is selected by the path switching software 13, by judging the balance of access loads and the occurrence of faults in the connection paths, and the like. Access is performed via the connection path 2, 3 thus selected, and data is input to, or output from, the portion of the group of hard disk drive devices 23 selected for the input/output port of the cluster 21, 22 which is being accessed.

In a system of this kind, exchange (updating) of micro programs provided in the input/output ports of the clusters 21, 22 is carried out in the following manner.

More specifically, in the present embodiment shown in FIG. 1, the management server device 5 is provided as a separate unit, and this management server device 5 is connected via a LAN (Local Area Network) 6 to the path switching software 13 in the host computer 1 and the internal management device 24 in the storage device 4. Furthermore, the management server device 5 is provided with a program exchanging program (software) 31 and an updated micro program 32 to be supplied for the exchange operation.

Furthermore, a computer device 33 forming a client machine is connected to the management server device 5, and supply of updated micro programs 32 and commands for invoking the micro program exchange program 31, and the like, can be carried out by means of this computer device 33. The management server device 5 is also assigned with specific addresses (for example, World Wide Names (WWN)), and is accessed via the LAN 6 on the basis of these addresses.

Consequently, in this system, the exchange of micro programs 32 is carried out by starting up the program exchanging program 31. In the program exchanging program 31, the programs are exchanged by means of the sequence illustrated in FIG. 2, for example. More specifically, FIG. 2 shows the interactive operations of the path switching software 13 in the host computer 1, and the internal management device 24 of the storage device 4, performed via the management server device 5.

Figure 2:
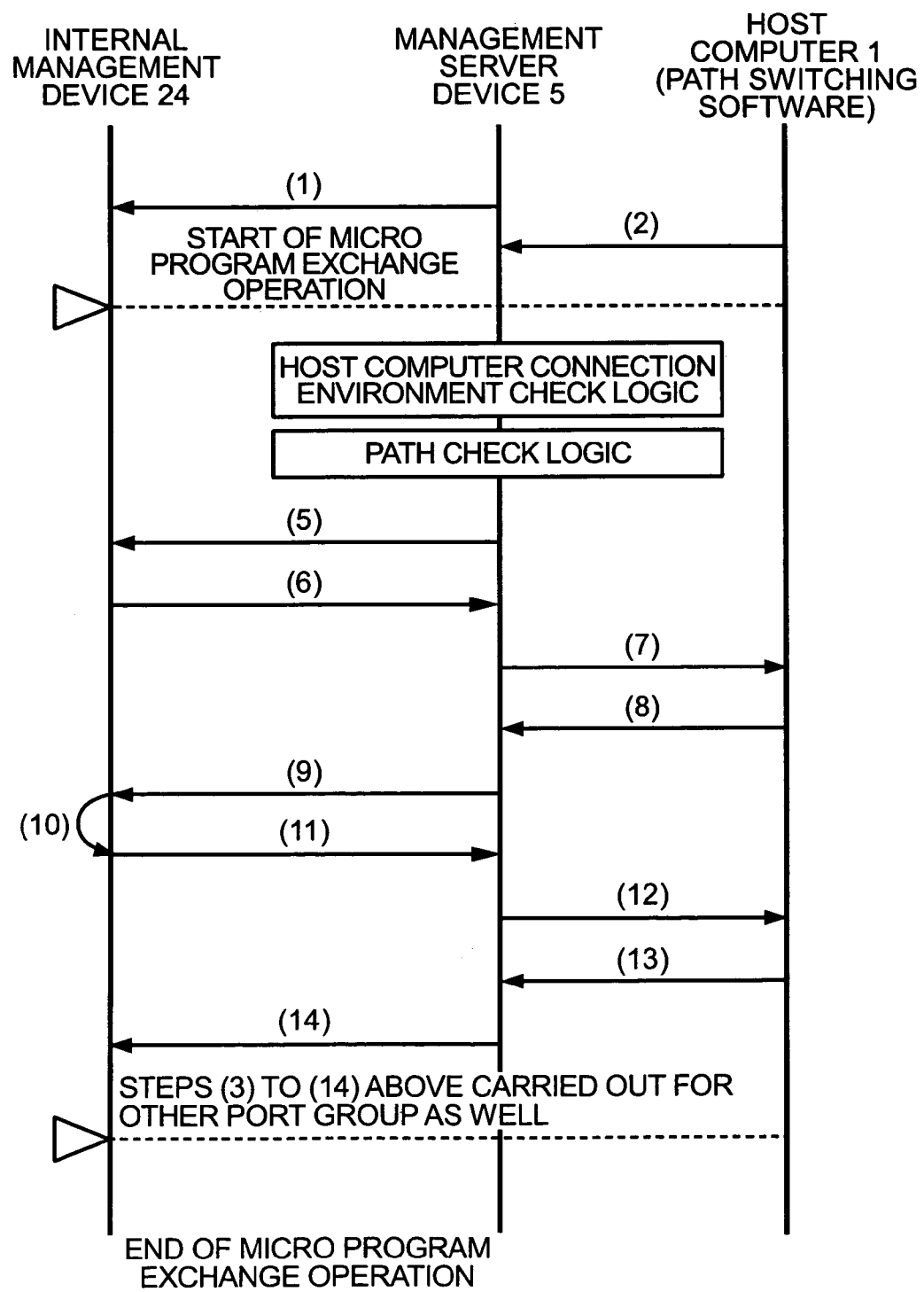
FIG. 2 is a sequence diagram for describing one operation of the present invention.

In FIG. 2, in procedure (1), the address of the management server device 5 is reported to the internal management device 24. Firstly, in order to perform communications between the management server device 5 and the internal management device 24, the respective IP addresses are set up. By this means, it becomes possible to exchange information, and information relating to the composition of the RAID device is obtained from the internal management device 24, this information comprising, specifically, internal RAID information such as the respective port numbers, and the device numbers of the group of hard disk drive devices 23 located under each port, and the like, and external information, such as the addresses of the path adapters connected to each port, and the like. These information elements have a data structure such as that illustrated in FIG. 3, and are stored, for example, in the database 25 of the storage device 4.

Next, in procedure (2), the fact that the path switching software 13 is running on the host computer 1 is reported by the host computer 1 to the management server device 5. In order to perform communications between the management server device 5 and the host computer 1, the respective IP addresses are set up previously. By this means, it becomes possible to exchange information, and information relating to the composition of the host computer 1, and more specifically, information, such as the addresses of the path adapter, and the operational/non-operational status of the path switching software 13, and the like, are obtained. These information elements have a data structure such as that illustrated in FIG. 3, and are stored, for example, in the database 14 of host computer 1.

These procedures (1), (2) carry out preparation, whereupon the task of exchanging micro programs is started. In FIG. 2, the sequence from procedure (3) onwards shows a case where the blocked off port is managed under the direction of the management server (a case where both compositions are initially analyzed, and the possible combinations are calculated).

Therefore, in procedure (3), all of the addresses of the input/output ports of the clusters 21, 22 in question are checked, and it is also checked that the path switching software 13 is operating on all of the host computers 1 in which that address is present. The embodiment in FIG. 1 shows a DAS environment, but in this procedure (3), a SAN environment is assumed. In procedure (3), if there is a host computer in which the path switching software has not been installed, then automatic processing is not possible, and the processing sequence is interrupted.

Moreover, in procedure (4), a search for blockable combinations is made. Here, a minimal procedure is adopted, as described hereinafter, in such a manner that only the smallest possible number of micro program exchange instructions is required. Furthermore, in procedure (4), if there are no blockable combinations, then automatic processing is not possible and the processing sequence is interrupted. More specifically, if the processing is interrupted in these procedures (3) (4), then since automatic processing is not possible, the necessary tasks are performed manually, similarly to the prior art.

If automatic processing is possible, then in procedure (5), it is reported which port is to be blocked off (which port is to be the object of micro program exchange), and in procedure (6), the start of micro program exchange is reported (information on the portion to which the path is blocked off is reported). In procedure (7), the path switching software 13 is called in all of the relevant host computers 1, and the path is switched. More specifically, the connection path connected to the region that is to be blocked off is halted, and switched to a different connection path.

When path switching has been completed, in procedure (8), a path switching complete report (OK/NG report) is sent by the path switching software 13 to the management server device 5. Furthermore, in procedure (9), the path switching completed report (OK/NG report) is sent by the management server device 5 to the internal management device 24. Here, if the report is NG, then automatic processing is not possible, and processing is interrupted, and simultaneously, if there are any connection paths that have already been halted, then these connection path are recovered.

In procedure (10), micro program exchange is carried out. More specifically, if it is confirmed that the path switched has been carried out correctly, then the micro program in the blocked off region is updated. Moreover, in procedure (11), the completion of micro program exchange is reported. More specifically, when updating of the micro programs has been completed, a completion report is forwarded to the management server device 5.

Thereby, when the completion of micro program updating is reported, in procedure (12), processing for recovering the connection paths 2, 3 is instructed. In other words, a path recovery instruction is issued by the management server device 5 to the path switching software 13. When path recovery is completed in procedure (13), then in procedure (14), a path recovery completion report is transmitted.

Moreover, these procedures (3) to (14) are carried out successively for each of the clusters 21, 22 for which the micro programs are to be updated. When micro program updating has been completed for all of the input/output ports of the respective clusters 21, 22, then it is taken that update processing has been completed for all of the micro programs.

Therefore, in the present embodiment, the ports at which input/output can be halted are set automatically by searching the databases of the host computer and the storage device, and the ports at which input/output can be halted are set in cooperation with the path switching function in the host computer, and therefore the exchange of micro programs can be carried out by halting the input/output ports thus set, in a successive fashion, and hence the exchange of micro programs in the storage device can be carried out automatically, without halting operation.

By this means, according to the present invention, it is possible readily to overcome the problems associated with a conventional device, namely, the fact that it has been necessary to provide surplus composition, such as spare ports, or the like, in order to exchange micro programs without halting the operation of the storage device, and the fact that exchanging programs requires manual work and this work cannot be automated in a conventional device.

Figure 5:
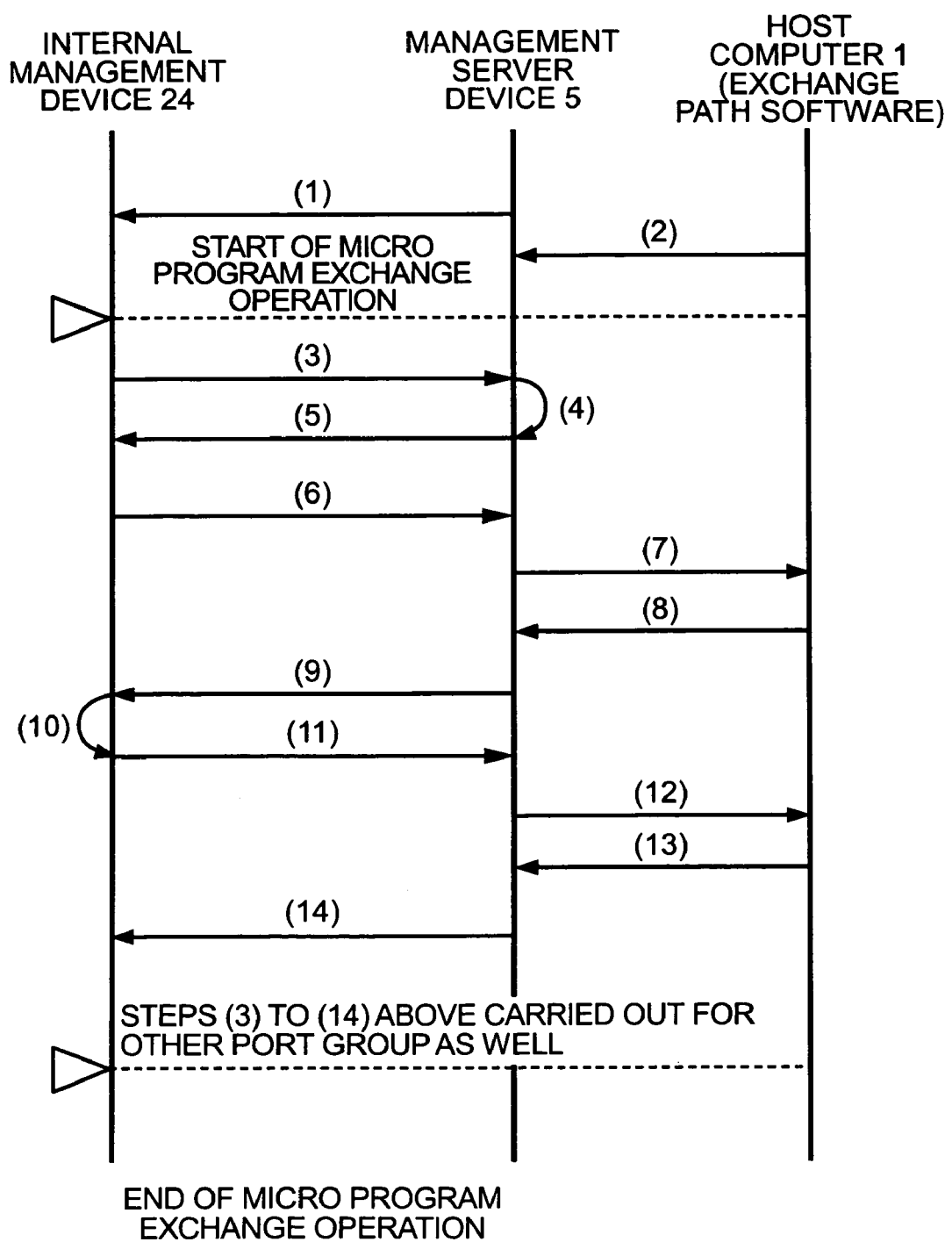
FIG. 5 is a sequence diagram for describing a further operation of the present invention.

Moreover, FIG. 5 shows a further embodiment of a processing sequence for exchanging programs by means of the program exchanging program 31. In FIG. 5, procedures (1) and (2) are preparation stages and are the same as those in FIG. 2. In FIG. 5, the sequence from procedure (3) onwards shows a case where the blocked off ports are managed under the direction of the internal management device 24 of the RAID device. According to the sequence in FIG. 5, the load on the internal management device 24 is increased, but the procedure is simplified and increased performance can be achieved.

Firstly, in procedure (3), a list of the ports to be blocked off (ports to be object of micro program exchange) is reported by the management server device 5 to the internal management device 24. Here, the sequence starts from simple combinations, taking performance into account. In other words, in the case of the composition in FIG. 1, firstly, the ports are divided into cluster 21 and cluster 22, and these are taken as a combination for performing micro program exchange. Accordingly, it is possible to carry out micro program exchange in a minimum of two procedures, conducted in successive fashion.

Therefore, in procedure (4), all of the addresses of the input/output ports of the cluster in question are checked in the management server device 5, and it is also checked that the path switching software 13 is operating on all of the host computers 1 in which that address is present. Furthermore, it is confirmed whether or not the path status is normal. In procedure (5), the checking in procedure (4) is repeated. Thereby, in cases where the path switching software 13 is not installed on all of the host computers 1, and in cases where the path status is not normal, then automatic processing becomes impossible and the processing sequence is interrupted.

In procedure (6), the start of micro program exchange is reported, whereupon the processing is carried out in a similar manner to the sequence in FIG. 2, until procedure (14). Moreover, these procedures (3) to (14) are carried out successively for the clusters 21, 22 for which the micro programs are to be updated. When micro program updating has been completed for all of the input/output ports, then it is taken that update processing has been completed for all of the micro programs.

Figure 6:
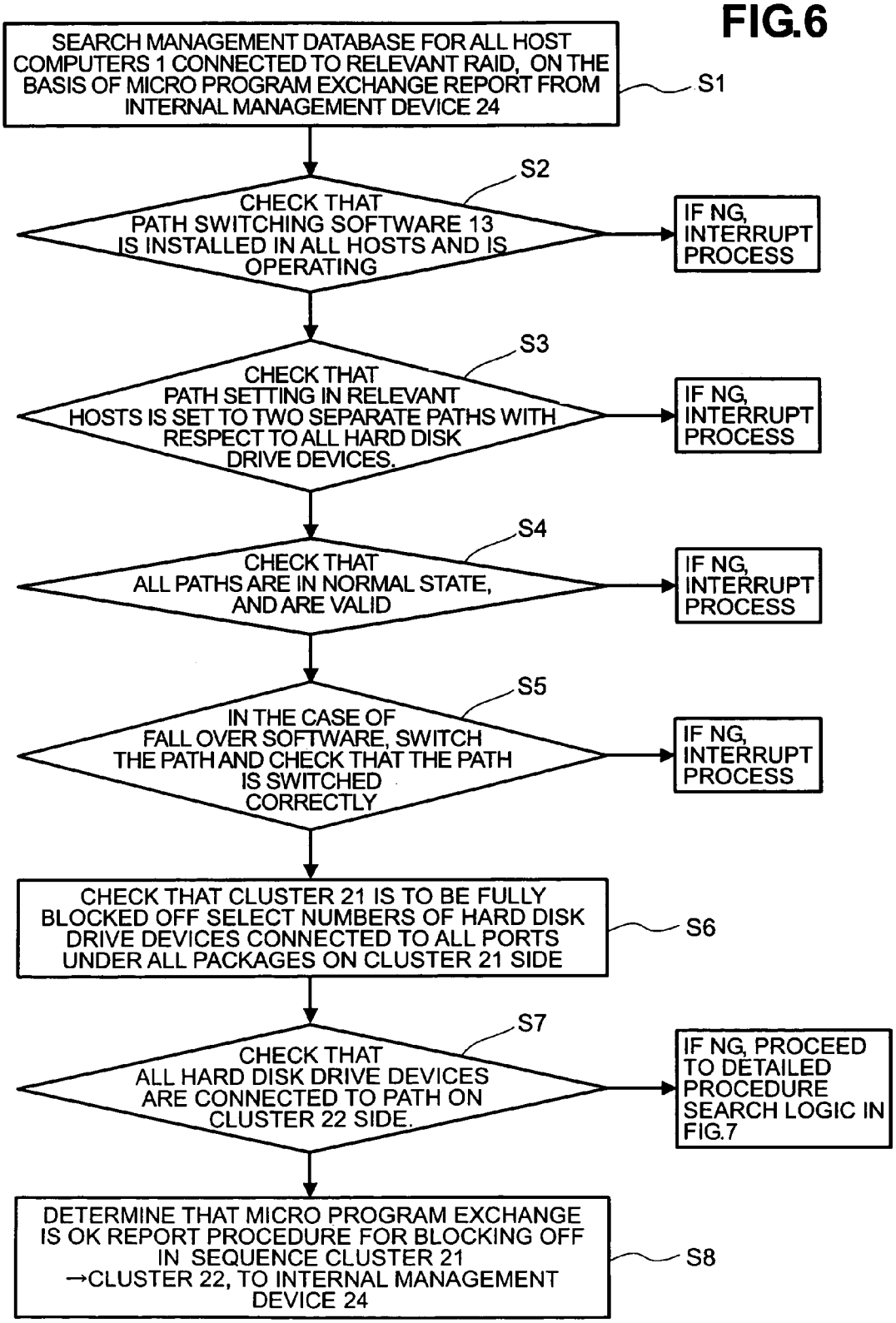
FIG. 6 is a flowchart for describing the operation of the present invention.

Therefore, the overall processing for exchanging micro programs, comprising the sequences in FIG. 2 and FIG. 5, is as illustrated by the flowchart in FIG. 6.

More specifically, in FIG. 6, at step S1, the management database 25 is searched to identify all of the host computers 1 connected to the RAID device in question, on the basis of a micro program exchange implementation report from the internal management device 24, for example. Next, at step S2, it is checked whether or not the path switching software 13 is installed and running in all of the host computers 1. Here, if it is not installed in one of the host computers (NG), then the automatic processing is terminated.

Furthermore, at step S3, it is checked that the path settings for the host computers 1 in question are set respectively to two separate paths, with respect to all of the hard disk drive devices in the RAID device in question. Here, if the path is not set to two separate paths (NG), then the automatic processing is terminated. Moreover, at step S4, it is confirmed whether or not the paths are all in a normal state and are all valid. Here, if the paths are not all in a normal state and are not all valid (NG), then the automatic processing is terminated.

If the path switching software 13 installed in the host computers 1 is so-called "fail over" software, then at step S5, the path is switched and it is checked that the path has been switched correctly. Here too, if the path is not switched correctly (NG), then automatic processing is terminated. In this way, in these steps S2 to S5, it is confirmed whether or not the system is compatible with the program exchanging program according to the present invention.

Furthermore, at step S6, it is checked that the whole of the cluster 21 is to be blocked off. In other words, here, the device numbers of the group of hard disk drive devices 23 connected below the cluster 21 are selected. At step S7, it is checked that all of the selected device numbers are connected to the path on the cluster 22 side. Thereby, when connection is confirmed, then at step S8, micro program exchange is carried out by blocking off the input/output ports contained in the respective clusters, in the order cluster 21, followed by cluster 22, for example.

Figure 7:
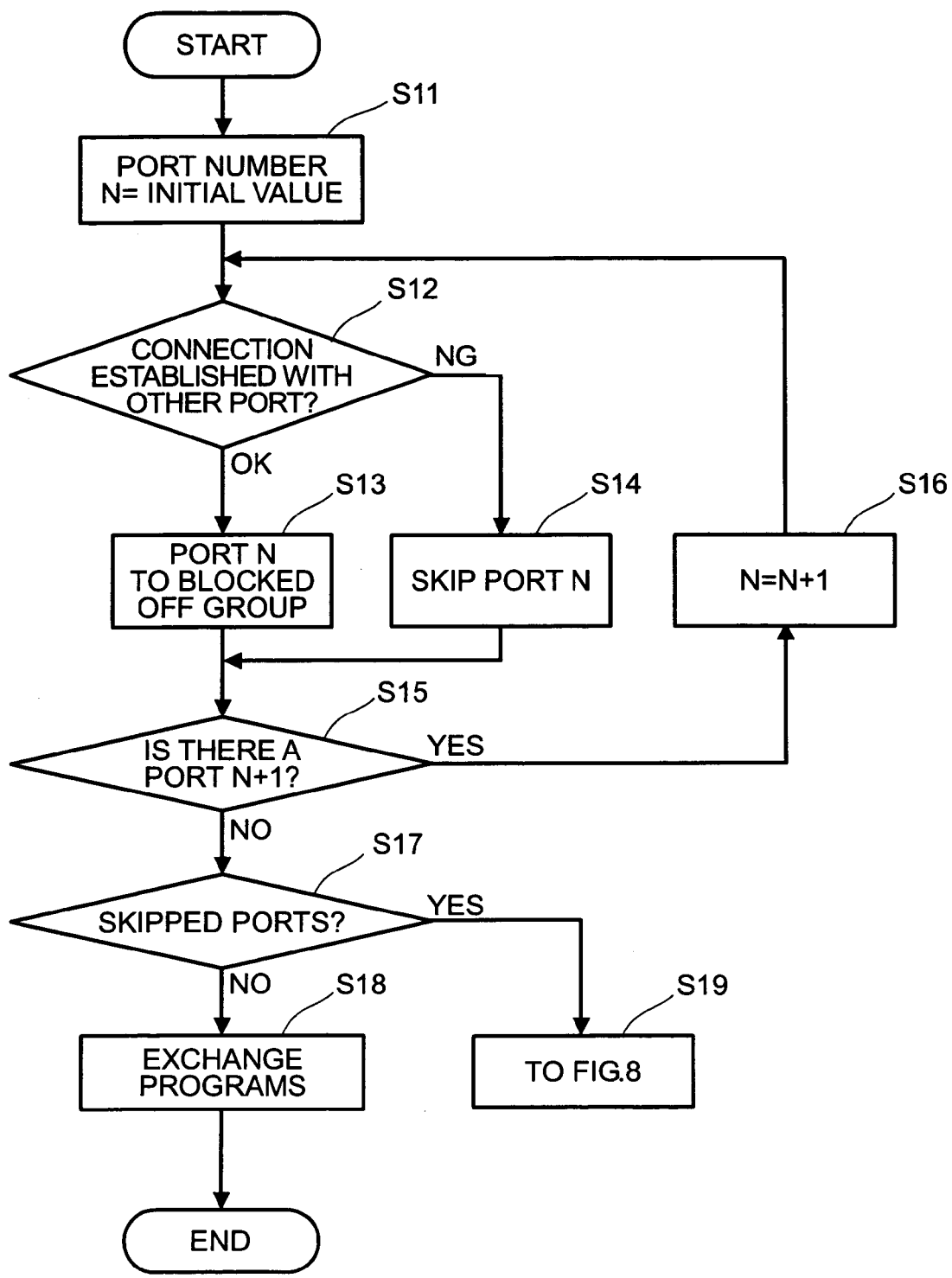
FIG. 7 is a principal part flowchart for describing the operation of the present invention.

Moreover, the connection is not confirmed at step S7 (NG), then the search logic contained in the detailed routine illustrated in FIG. 7 is initiated. More specifically, although the respective clusters 21, 22 are each constituted by a plurality of input/output ports, as described above, it is possible to exchange micro programs by halting the functions of these input/output ports, individually. In FIG. 7, a search is performed for the input/output ports within each cluster 21, 22.

In FIG. 7, at step S11, the input/output port number N is set to an initial value for the cluster being searched. At step S12, if the input/output port N is blocked off, then it is checked that the hard disk drive device under that port has established a connection with another input/output port. Here, if such a connection has been made, then at step S13, the input/output port N is written to the blocked off group. Moreover, if such a connection has not been made, then at step S14, the input/output port N is skipped.

Moreover, at step S15, it is judged whether or not a subsequent input/output port N+1 exists, and if it does exist, then at step S16, the input/output port number N is incremented to N=N+1, and the sequence returns to step S12. Furthermore, at step S15, if there does not exist a subsequent input/output port N+1, then at step S17, it is judged whether or not there is an input/output port that has been skipped. If there are no skipped ports, then at step S18, the micro programs can be exchanged in one operation for the cluster in question.

Figure 8:
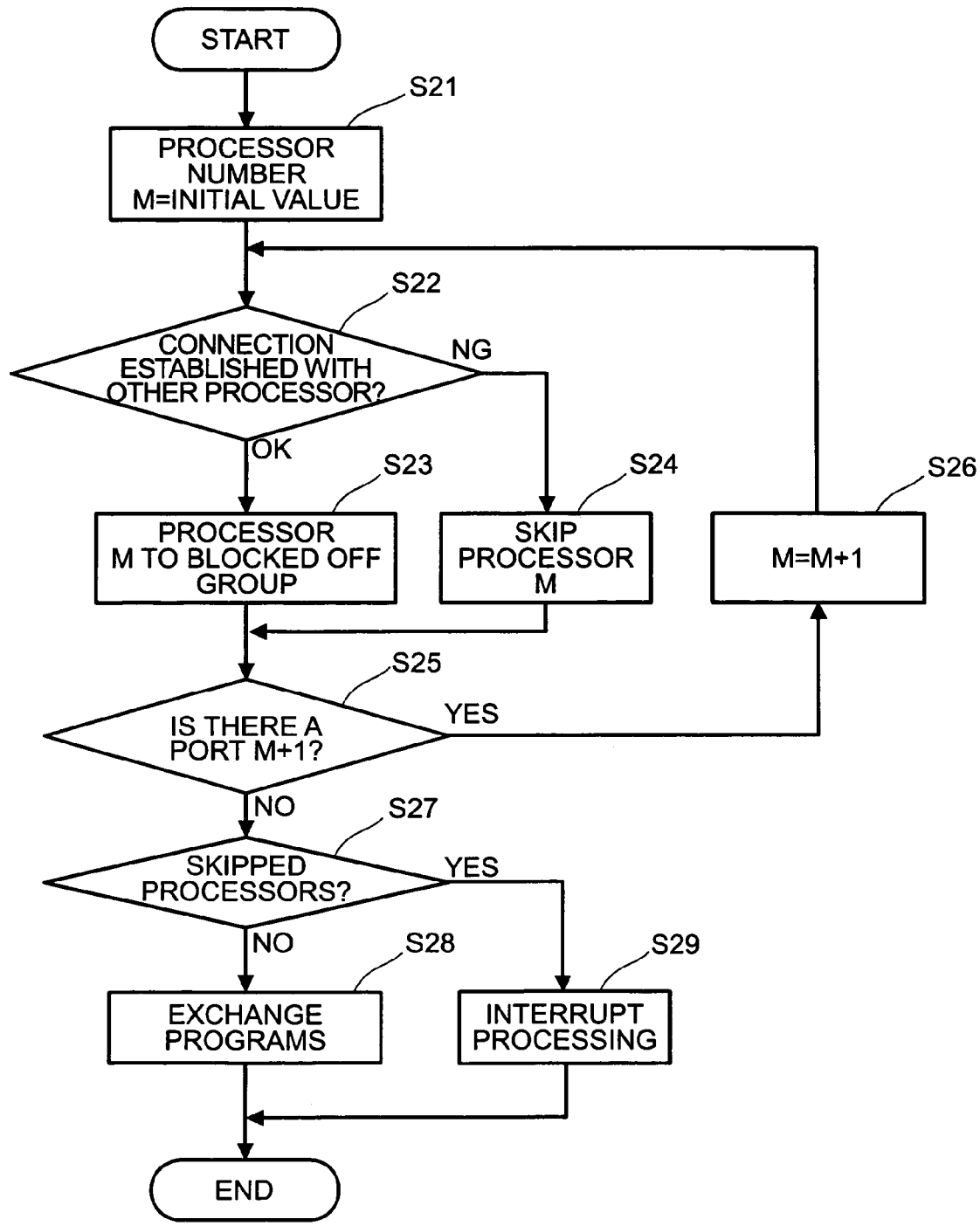
FIG. 8 is a principal part flowchart for describing the operation of the present invention.

Furthermore, if there is a skipped port at step S17, then the sequence advances to step S19, and a similar search is performed with respect to the group of processors contained in each of these input/output ports. This search is extended ultimately until each entry point connected to the respective hard disk devices controlled by the respective processors. FIG. 8 shows the final stage of processing after step S19, and in this diagram, a search is carried out with respect to the processors in each group.

More specifically, in FIG. 8, at step S21, the processor number M is set to an initial value for the group being searched. At step S22, if that processor M is blocked off, then it is checked that the hard disk drive device under that processor has established a connection with another processor. Here, if such a connection has been established, then at step S23, the processor M is written to the blocked off group. Moreover, if such a connection has not been established, then at step S24, the processor M is skipped.

Moreover, at step S25, it is judged whether or not a subsequent processor M+1 exists, and if it does exist, then at step S26, the processor number M is incremented to M=M+1, and the sequence returns to step S22. Furthermore, at step S25, if there does not exist a subsequent processor M+1, then at step S27, it is judged whether or not there is a processor that has been skipped. If there are no skipped processors, then at step S28, the micro programs can be exchanged in one operation for the group in question.

If, on the other hand, a processor has been skipped, at step S27, then automatic processing is not possible, and at step S28, a notification to this effect is reported to the client computer 33, for example, and processing is interrupted. In other words, in this case, since automatic processing is not possible, the work must be carried out manually, as in the prior art, and an indication prompting this is issued.

As described above, in the present embodiment, the setting of ports for which input/output can be halted is carried out automatically by searching the databases in the host computer and the storage device, and the ports for which input/output can be halted are set in cooperation with the path switching function in the host computer. Accordingly, it is possible to carry out exchange of micro programs whilst halting the established input/output ports, in a successive fashion, and exchange of micro programs in the storage device can be performed automatically, without halting operation, in addition to which, the micro programs can be exchanged in a more efficient manner, by performing exchange of micro programs in larger units.

Furthermore, the present invention can also be implemented in cases where there are three or more path adapters in the host computer 1, as shown in FIG. 9, for example, and it can also be implemented in cases where the connections to the group of hard disk drive devices 23 under the respective input/output ports have been established by a user, as illustrated in FIG. 10, for example.

More specifically, even in the case illustrated in FIG. 9, it is possible to respond by means of the checking logic in the management server device 5 checking whether or not the path is valid, for all of the existing paths apart from the blocked off paths. Furthermore, even in the case illustrated in FIG. 10, it is possible to respond by means of the checking logic in the management server checking whether or not the path is valid, in path units from the WWN units through to the respective group of hard disk drive devices 23.

By this means, according to the present invention, even in cases where there are three or more connection paths between the host computer 1 and the storage device (RAID device) 4, and where the switching path setting is not load balanced (fail over setting), then it is still checked whether or not there is a valid path in the paths that are not to be blocked off, and if there is no valid path, then a command for making at least one of the paths valid (executing path switching) is issued, thereby making it possible to carry out micro program exchange, automatically, in a system with any settings.

Moreover, the present invention can be distributed in the form of a software package comprising the program exchanging program 31 provided in the management server device 5 in the foregoing embodiment, and the updated version of the micro programs 32 to be used in the exchange operation. In other words, the present invention can be implemented in the form of a package of software of this kind.

Figure 11:
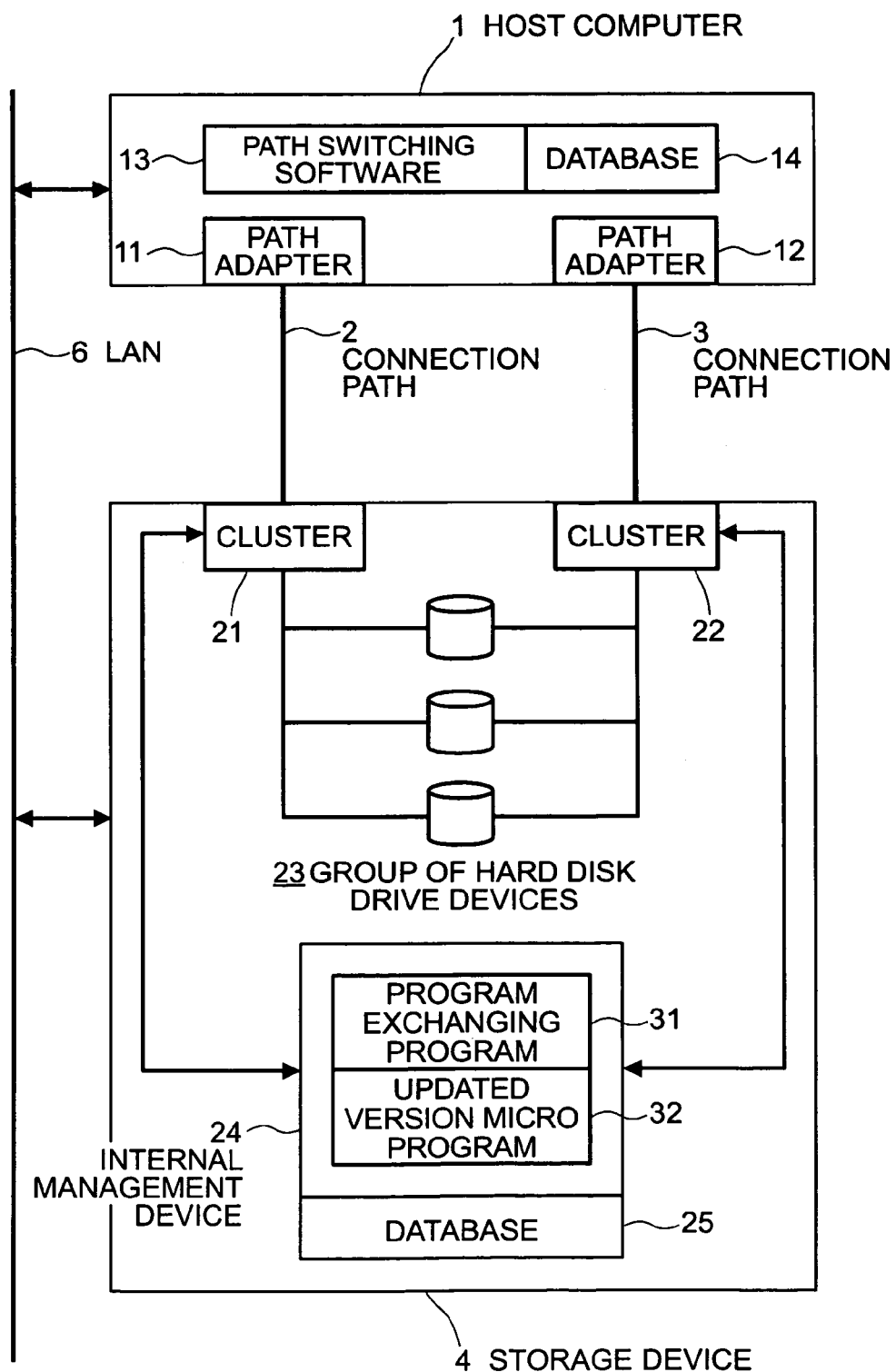
FIG. 11 is a block diagram showing the composition of a further embodiment of an information management system to which the present invention is applied.
Figure 12:
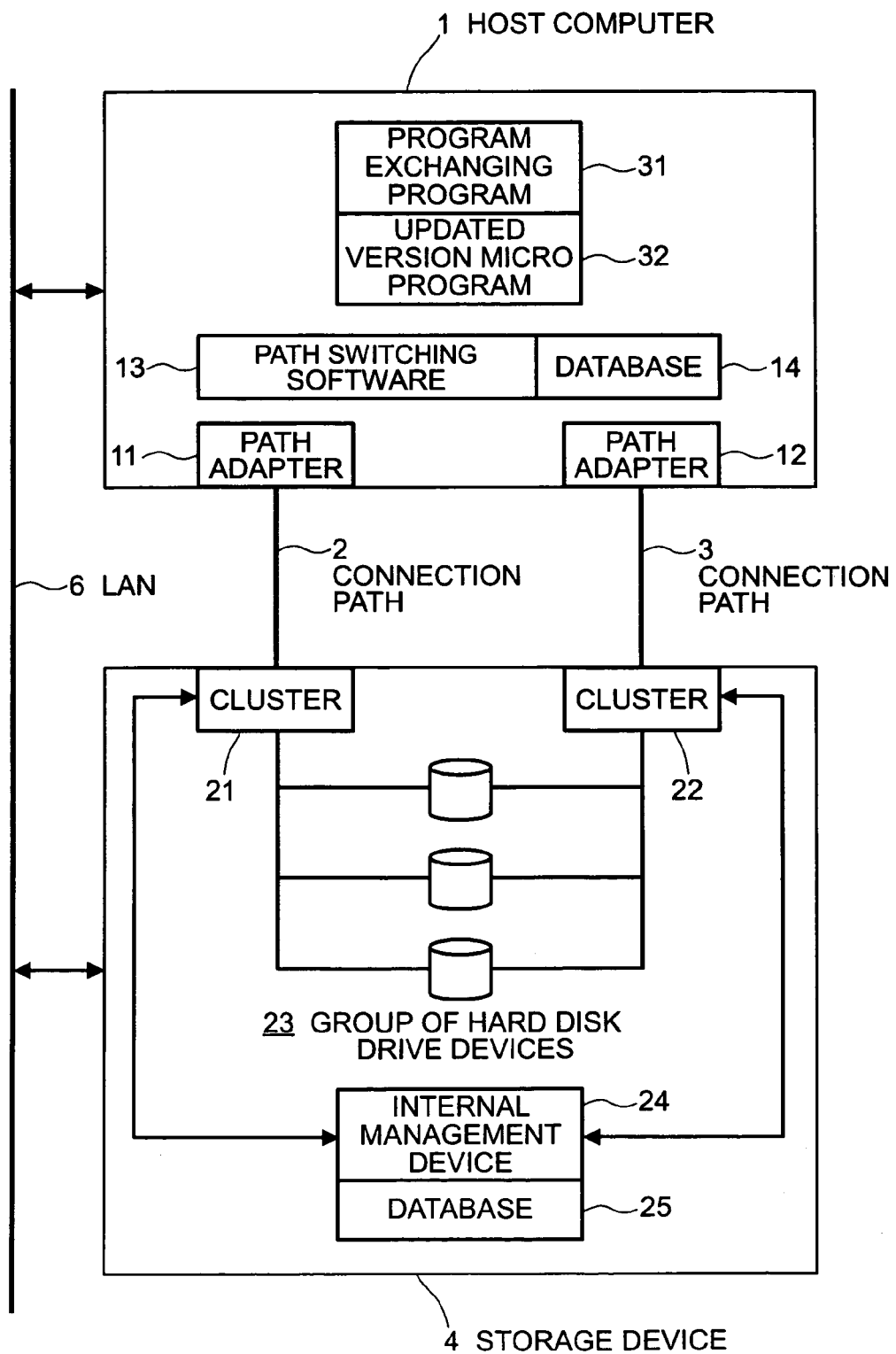
FIG. 12 is a block diagram showing the composition of yet a further embodiment of an information management system to which the present invention is applied.

Moreover, the program exchanging program 31 can be incorporated into the internal management device 24, as illustrated in FIG. 11. Alternatively, as shown in FIG. 12, the program exchanging program 31 can also be incorporated into the host computer 1. If the program exchanging program 31 is incorporated into the device in this way, then micro program exchange is executed by further installing the updated micro program 32 in the internal management device 24 or the host computer 1.

Figure 13:
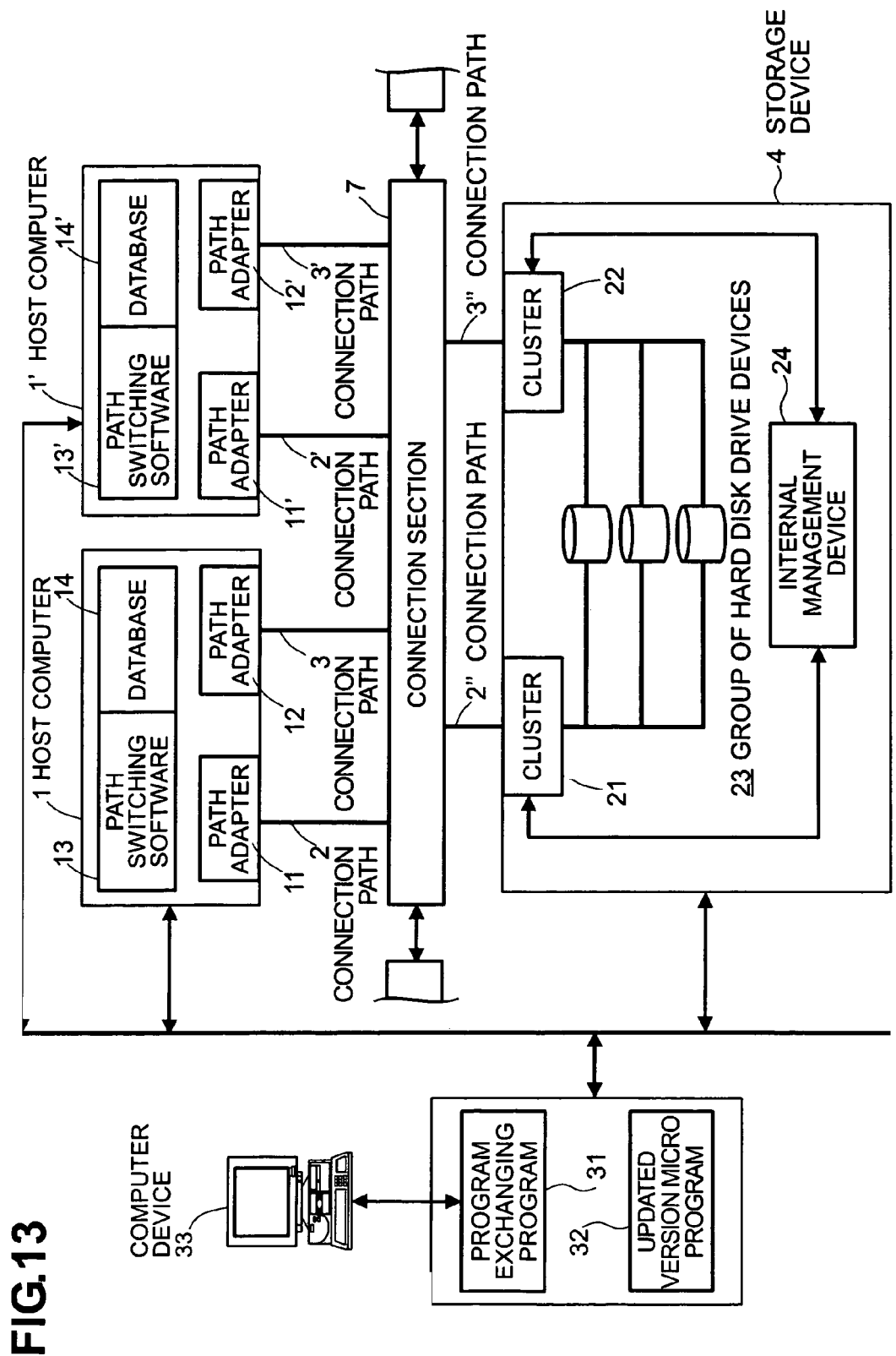
FIG. 13 is a block diagram showing the composition of an embodiment of an information management system in which the present invention is applied to a SAN environment.

Furthermore, the present invention can also be applied to a storage device in a SAN environment such as that illustrated in FIG. 13. More specifically, in FIG. 13, the connection paths 2, 3, 2', 3' from two host computers 1, 1' are respectively connected to a storage device 4, by means of connecting section 7. A plurality of similar connecting sections 7 are provided, and a network is constituted by connecting these together mutually.

In a SAN environment system of this kind, the present invention can be implemented by checking all of the addresses of the input/output ports of the clusters 21, 22 in question, and checking that the path switching software 13 is operating on all of the host computers 1 in which these addresses are present, in the procedure (3) described above in the explanation of the sequence in FIG. 2. However, in this case, it is a prerequisite that a connection is provided between the management server device 5 and the host computers 1, 1', by means of a LAN 6, for example.

Figure 14:
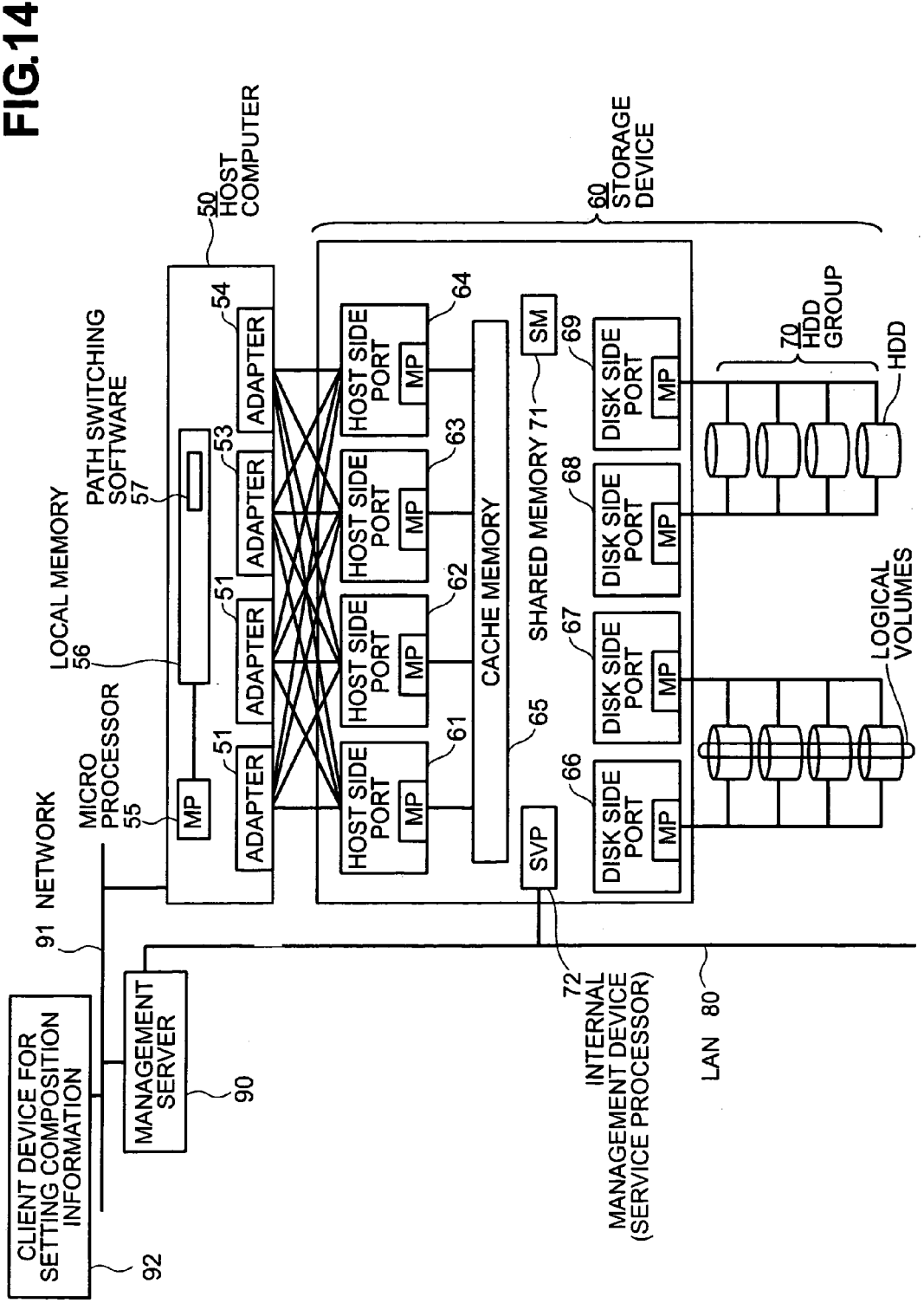
FIG. 14 is a block diagram showing the composition of constituent elements of the present invention.
Figure 15:
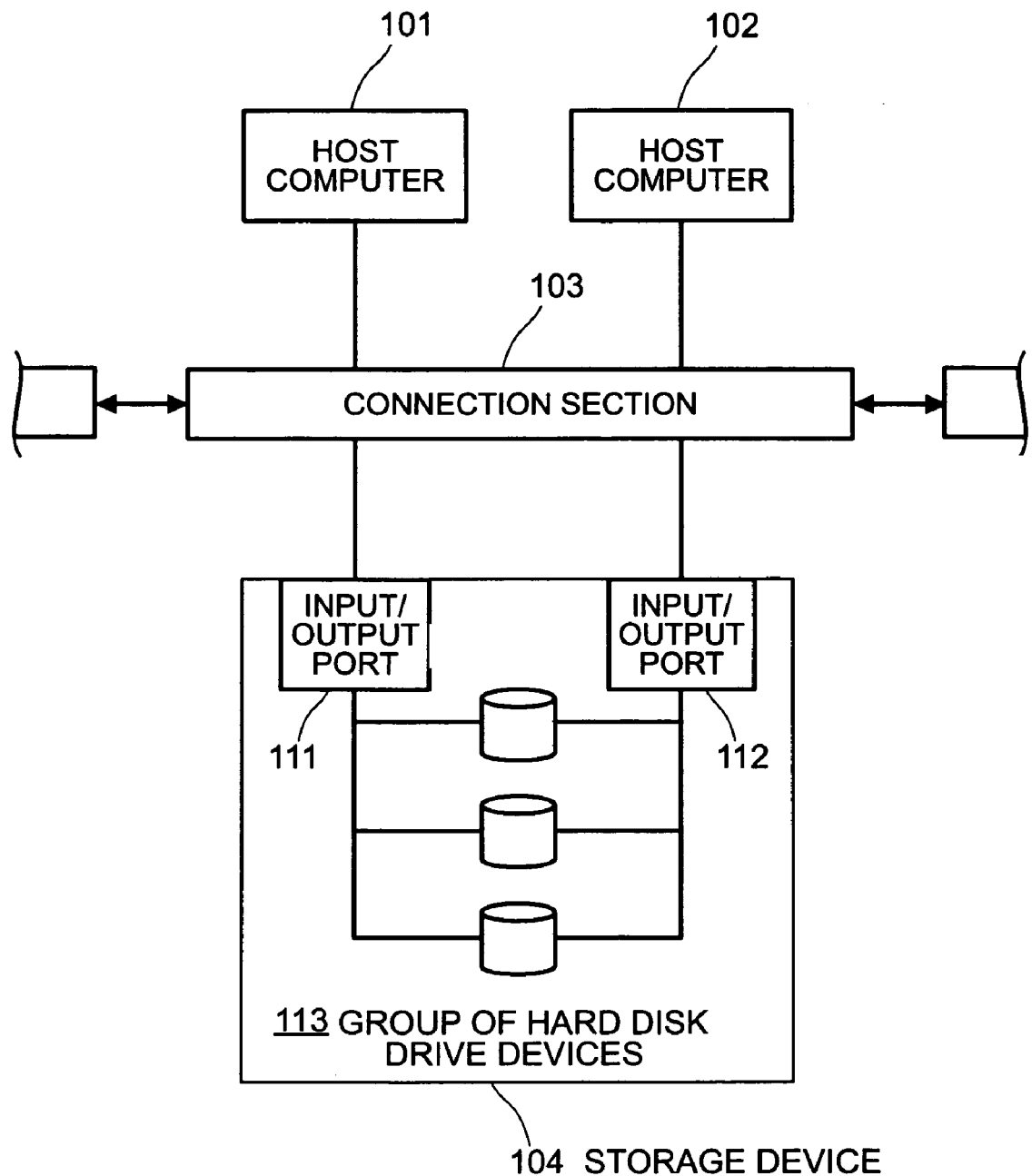
FIG. 15 is a block diagram showing the composition of a conventional information processing system.

Furthermore, FIG. 14 shows a block diagram of the composition of the elements of the present invention. In the composition shown in FIG. 14, four path adapters 51 to 54, for example, are provided in the host computer 50. Furthermore, a micro processor (MP) 55 is provided in the host computer 50 in order to control the path adapters 51 to 54, and the like. This micro processor (MP) 55 has a local memory 56, and path switching software 57 is provided in this local memory 56.

On the other hand, four host side ports 61 to 64 are provided in the storage device 60. These path adapters 51 to 54 and the host side ports 61 to 64 are mutually interconnected in a comprehensive fashion, in such a manner that each element on each side is connected to all of the elements on the other side. Furthermore, these host side ports 61 to 64 are connection ports for receiving commands and data from the host computer 50, and each comprises an internal micro processor (MP).

These micro processors (MP) interpret the commands issued by the upper-level device (for example, read or write commands), and read or write data from and to a cache memory 65 positioned below same, accordingly. The cache memory 65 is a RAM (Random Access Memory) which holds data of the kind described above, on a temporary basis, and when the storage device 60 has received data into the cache memory 65, then even if it has not written the data to the group of hard disk drive devices 70 positioned below same, a command processing completion response is still sent to the host computer 50.

Furthermore, disk side ports 66 to 69 are provided for writing data from the aforementioned cache memory 65 to the group of hard disk drive devices (HDD) 70, or reading data from the group of hard disk drive devices 70, into the cache memory 65. Internal microprocessors (MP) are also provided in these disk side ports 66 to 69.

In other words, as described in the foregoing explanation, the present invention can be applied even if a communication path to the group of hard disk drive devices (HDD) 70 is not secured, provided that a communication path to the adapters 51 to 54 and the cache memory 65 is secured. This is because a completion response is issued to the upper-level device upon writing to the cache memory 65.

In the aforementioned composition, information relating to the internal composition of the storage device 60 is stored in a shared memory (SM) 71. This shared memory (SM) 71 is used on a shared basis. The respective micro processors (MP) carry out write or read processing, in accordance with this internal composition information. Moreover, a logical volume is a management unit of the storage region specified as spanning the storage regions of a plurality of hard disk drive devices (HDD), and the host computer 50 controls writing or reading of data to or from this logical volume.

Information required in practice to write from the host computer 50 to the hard disk drive devices (HDD), such as the relationship between the logical volumes and the aforementioned storage regions of the hard disk drive devices (HDD), or the connections between the adapters 51 to 54 of the host computer 50 and the logical volumes, or the like, is stored in the shared memory (SM) 71 as the composition information described previously.

Moreover, an internal management device may be provided in a service processor (SVP) 72. A service processor (SVP) 72 is a processor capable of reading and modifying information contained in the shared memory (SM) 71, and it is connected to each port of the storage device 60, and to the shared memory (SM) 71, by means of an internal device LAN (not illustrated). Furthermore, this service processor (SVP) 72 is connected to an external device, for example, a management server 90, by means of a communications circuit, such as a LAN 80, or the like. Furthermore, a client device 92 for setting compositional information is connected to the management server 90, via a network 91, for example.

The internal management device refers to the compositional information in the shared memory (SM) 71 and monitors the status of the communications paths. Furthermore, by this means, even if one of the micro processors (MP) is blocked off, it is possible to determine whether or not a communications path has been established following another path, in such a manner that commands sent by the host computer 50 side adapters 51 to 54 can be received and interpreted by any one of the remaining host side ports 61 to 64, and data can be written into the cache memory 65, in the case of a write command.

In this way, according to the composition described above, the host computer uses a path switching program to establish communications paths between a plurality of adapters in the host computer and a plurality of host side ports in the storage device, the storage device accumulates information relating to the communications paths in a shared memory, and the internal management device of the storage device judges whether or not a communications path is secured in the event of at least one of the plurality of processors being blocked off, and if a communications path can be secured, then the internal management device is able to send a notification to the management server indicating that the processor that was the object of the judgment operation can be blocked off.

The present invention is not limited to the embodiments described above, and various modifications thereof are possible, without deviating from the spirit of the present invention.

What is claimed is:

1. An information processing system, comprising:
a host computer having a plurality of adapters;
a storage device having a plurality of host side ports connected to the host computer; a plurality of processors for controlling said plurality of host side ports; a cache memory, connected to said plurality of host side ports, for temporarily holding data in response to commands from said host computer; a shared memory for accumulating information relating to an internal composition of said storage device for reference by said plurality of processors; and an internal management device for outputting said compositional information to an external device; and
a management server connected respectively to said internal management device and said host computer, by a communications circuit;
wherein said host computer executes a path switching program, and establishes communications paths between said plurality of adapters and said plurality of host side ports;
wherein said storage device accumulates information relating to said communications paths, in said shared memory, and said internal management device refers to said information relating to communications paths and judges whether or not communications paths from said plurality of adapters to said cache memory can be secured in the event of at least one of said processors being blocked off; and
wherein, if a judgment result of said internal management device is that said communications paths can be secured, then said internal management device sends a notification indicating that it is possible to block off the processors for which said judgment was made, to said management server, via said communications circuit.

2. The information processing system according to claim 1, wherein said management server, after receiving said notification, sends information indicating that the communications paths connected to the processors for which said judgment has been made are to be blocked off, to said host computer executing said path switching program.

3. An information processing method for a host computer, a storage device, and a management server; the host computer including a plurality of adapters; the storage device having a plurality of host side ports connected to the host computer, a plurality of processors for controlling said plurality of host side ports, a cache memory connected to said plurality of host side ports for temporarily holding data in response to commands from said host computer; the management server connected respectively to said storage device and said host computer by a communications circuit; the information processing method comprising:

judging whether or not communications paths from said plurality of adapters to said cache memory can be secured in the event of at least one of said processors being blocked off, based on information relating to communications paths from said plurality of adapters to said plurality of host side ports; and sending a notification to said management server via said communications circuit, if it is judged that said communications paths can be secured, indicating that it is possible to block off the processor for which said judgment was made.

4. The information processing method of claim 3 further comprising receiving information indicating that the communications paths connected to the processors for which said judgment has been made are to be blocked off, from said management server, for executing a path switching program to establish communications paths between said plurality of adapters and said plurality of host side ports.

5. The information processing method of claim 3 further comprising accessing, from a shared memory of said storage device, information relating to communications paths between said plurality of adapters and said plurality of host side ports, said information to be used for judging whether or not communications paths from said plurality of adapters to said cache memory can be secured in the event of at least one of said processors being blocked off.

* * * * *